United States Patent Office
3,502,589
Patented Mar. 24, 1970

3,502,589
CATHODOLUMINESCENT PHOSPHOR-ORGANO-
POLYSILOXANE RESIN COMPOSITIONS
Charles W. Newing, Jr., Sylvania, Ohio, assignor to
Owens-Illinois, Inc., a corporation of Ohio
No Drawing. Filed June 21, 1965, Ser. No. 465,724
Int. Cl. C09k 1/02, 1/04; H01j 29/20
U.S. Cl. 252—301.3
10 Claims

ABSTRACT OF THE DISCLOSURE

Luminescent polysiloxane compositions and articles are described which luminesce when subjected to cathodic excitation and which are formed by heating, in the presence of water, a hydrolyzable silane compound of the formula:

$$R-Si(OR')_3$$

wherein R is methyl or phenyl and R' is a hydrolyzable group, and optionally a silane of the formula:

$$(R)_3-Si-OR'$$

and wherein the amount of water is at least 1.5 moles water per mole of hydrolyzable silane. The heating is carried out for at least one hour at a temperature of at least 50° C. Thereafter the hydrolysis product is condensed by raising the temperature over a time period of at least 5 minutes to a temperature of at least 100° C. to yield a heat curable polysiloxane. The latter is then partly cured by heating to a temperature of at least 100° C. to volatilize water. A phosphor in finely divided state or in solution is then homogeneously mixed with the partly cured siloxane and thereafter the cure of the siloxane is completed in the presence of the phosphor.

---

The present invention relates to organopolysiloxane resinous compositions exhibiting cathodoluminescence when subjected to cathodic excitation radiation, method of making same and cathodoluminescent articles produced therefrom.

In the past it has been difficult to obtain satisfactory resins exhibiting cathodoluminescence because polymeric materials prepared from monomers linked together by carbon-to-carbon bonding do not withstand cathodic discharge for extended periods of time. Plastics subjected to cathode ray bomardment for prolonged duration break up and deteriorate with resulting interference with the cathodoluminescence process.

Accordingly, it is an object of the present invention to provide cathodoluminescent organopolysiloxane resins that are capable of withstanding prolonged periods of cathodic excitation radiation while avoiding the disadvantages and shortcomings of prior known methods and compositions.

It is a further object of the present invention to provide organopolysiloxane resinous compositions containing inorganic cathodoluminescent phosphors which can be molded, cast, applied as coating or produced in the form of sheets and films which retain the properties of the inorganic phosphor over extended periods of exposure to cathode rays.

It is a further object of the present invention to provide a method for obtaining improved plastics exhibiting cathodoluminescence.

It is a further object of the present invention to provide articles fabricated from organopolysiloxane resinous compositions containing inorganic cathodoluminescent phosphors.

In attaining the above objects, one feature of the present invention resides in thermosetting organo-polysiloxane resins having dispersed therein phosphors that luminesce under cathodic excitation radiation.

Another feature of the present invention resides in dispersing finely divided cathodoluminescent phosphors into selected organopolysiloxane resins and then curing the mixture to produce a hard, heat stable product.

These and other objects, features and advantages of the present invention will become apparent from the following detailed description thereof.

According to the present invention, cathodoluminescent resins are obtained by dispersing an inorganic cathodoluminescent phosphor into the condensation product of at least one hydrolyzable silane represented by the formula:

(I) $$R_nSiZ_{4-n}$$

wherein R independently represents a member selected from the group consisting of methyl and phenyl and Z independently represents a hydrolyzable group and $n$ represents a positive integer from 1 to 3.

It will be understood, of course, by those skilled in the art that some or all of the Z's in Formula I can also represent an —OH group. Hence the term "hydrolyzable" as used herein and in the appended claims is intended to include within its meaning compounds wherein the hydrolyzable group or groups have already been hydrolyzed to an —OH group or groups. The term "condensation product" as used in the preceding paragraph and elsewhere in this specification and in the appended claims is intended to include the co-condensation products that result when mixtures of silicon containing starting reactants are employed.

Illustrative of hydrolyzable groups represented by Z in Formula I include —OH; halogen (chlorine, bromine, fluorine, iodine); alkoxy, that is, methoxy, through heptoxy; acyloxy (2–6 carbon atoms); and arloxy, for example, phenoxy. In particular, alkoxy groups are preferred because their hydrolysis products are generally less acidic and therefore control of the rate of siloxy condensation is simpler. Alkoxy groups, that have less than 5 carbon atoms, are especially advantageous and are preferred for the radical represented by Z in Formula I, as the rate of hydrolysis can be inconveniently slow when the organic hydrolyzable radical has a higher molecular weight.

The state of the art at present suggests that most commercial luminescent devices such as cathode ray targets are composed of polycrystalline cathodoluminescent phosphors which are prepared by sintering powdered inorganic reactants selected to provide the necessary host and activator components. The disadvantage inherent in the existing materials is caused by their susceptibility to chemical attack, poor abrasion resistance, poor thermal properties and in general difficulty of preparation. The present invention provides a means for overcoming such disadvantages by encapsulating phosphor materials in a substance of high chemical resistance and thermal resistance whereby the life of the phosphor is considerably prolonged and which gives satisfactory results when exposed to cathodic excitation radiation over extended periods of time.

The organopolysiloxane polymers suitable for the present invention are thermally stable at high temperatures, exhibit unmatched chemical resistance to water and organic solvents compared with conventional plastic resins and have excellent dielectric properties. Moreover, they are particularly valuable for purposes of the present invention because of their ability to withstand cathodic excitation radiation for extended periods.

Ranging in characteristics from liquid prepolymers to solid resinous materials, the polysiloxane polymers vary in molecular weight and degree of polymerization. The wide range of viscosities of the polymers indicates that the polymer can be applied as coatings or laminates by spraying, dipping and brushing. The polymers may also be cast as films and the like. Most preferably, the resins are clear and water white exhibiting a refractive index ranging from about 1.4 to about 1.5. The cured solids are glass-like in appearance but are tough solids easily machined with ordinary tools, thereby making them adaptable to be ground and polished to produce, for example, optically flat surfaces.

Organopolysiloxane cathodoluminescent resin compositions prepared according to the present invention are suitable for a wide variety of commercial applications including fluorescent lights, radiation detection devices and radar screens, luminous markers, signs, dials and the like.

Suitable phosphors which, when incorporated into the polysiloxane resins, result in a cathodoluminescent plastic include but are not limited to inorganic phosphors such as:

$Zn_2SiO_4$:Mn
$Zn_3(PO_4)_2$:Mn
ZnS:Ag
(ZnCd)S:Ag
(ZnCd)S:Cu
ZnS:Cu

Each of the above materials can be incorporated into the polysiloxane polymers described above and when subjected to cathodic discharge as, for example, from a tesla coil under vacuum exhibit cathodoluminescence.

Monomeric starting materials of the formula $R_nSiZ_{4-n}$ can be prepared by a variety of procedures known to the art. For example, a convenient route involves conversion of a halide, RX, to the corresponding lithium derivative, RLi, or Grignard reagent, RMgX, followed by condensation of the organometallic reagent with a silicon tetrahalide or an alkyl orthosilicate in a suitable molar ratio. Conversion of one hydrolyzable function on silicon to another can also be readily effected. Ethanolysis and acetolysis of silicon halides are examples of such conversions.

The means selected to effect hydrolysis of the starting materials and condensation of the resultant silanols is dependent primarily upon the physical characteristics desired in the product. When liquids or films are to be prepared, hydrolysis and condensation can be carried out simply by contacting the monomer or mixture of monomers with water. Usually, however, one or more conditions designed to increase speed or homogeneity of reaction, such as stirring, elevated temperatures, addition of acid or base, use of an added solvent, are used. Viscosity of the final product can be regulated by controlling the time of reaction, use of catalysts, concentration of reactants, rate of evaporation and similar variables. The particular manner in which control of these variables will be attained will depend on the particular circumstances, and can be determined by routine experimentation according to procedures generally well known to those skilled in the art.

In general, the preparation of the organopolysiloxane comprises heating a hydrolyzable silane including at least one compound embraced by Formula I with from 1.5 to 10 moles of water for each mole of the total molar amount of the hydrolyzable silane. Heating is continued for at least one hour and up to about 10 hours or more at a temperature of at least about 50° C. while retaining at least about 1.5 moles of hydroxy-containing by-products in the reaction mass per mole of silicon-containing starting material, assuming complete hydrolysis of all the alkoxy-silicon linkages in the said reaction mass. Thereafter the temperature of the reaction mass is gradually raised to a final temperature of from about 100° C. to about 300° C. while gradually removing by volatilization by-products such as alkanol and some water. This occurs over a time interval of at least 5 minutes. Thereafter, condensation and heating are continued in the aforesaid temperature range of from 100° to 300° C. for a period short of gel or solid formation within the said temperature range. If the quantity of water is in the range of from about 1.5 moles to about 5 moles of water per mole of the hydrolyzable silane, the hydroxy-containing by-products, e.g., alkanols formed during hydrolysis, act as a solvent for the other products and reactants, as a result of which the initially heterogeneous reaction mass becomes clear and homogeneous. This homogeneity is desirable, since it prevents resin precipitation and allows more uniform control of resin formation.

The exact upper limit of the ratio of water to hydrolyzable silicon-containing monomeric material is dependent upon such influencing factors as, for example, the particular hydrolyzable silicon-containing material employed, the pH and temperature of the reaction mass, time of reaction, etc. Hence the upper limit cannot be set forth precisely, but can be determined by routine test in each case. The limits within which no addition of organic solvent is required, viz., from about 1.5 moles to about 5.0 moles of water per mole of hydrolyzable silicon-containing monomer, are preferred.

At pressures near one atmosphere, temperatures in the range of from about 50° C. to the reflux temperature of the reaction mass are useful. Temperatures much below this range require substantially longer times for reaction, and thus obviate a particularly advantageous aspect of the resin-making process, namely, its relatively high speed of operation. Also, no particular improvement in properties is attained by the use of such lower temperatures. In general, temperatures at or near the reflux temperature of the reaction mass are preferred, especially when refluxing occurs at from about 70° C. to about 90° C. Under the concentration and temperature conditions hereinbefore described, the initial hydrolysis and condensation are complete in from about 1 to about 10 hours, depending upon the particular materials and conditions used, and generally within from about 2 to 3 hours.

After initial hydrolysis and condensation under the conditions just described, controlled volatilization of the hydrolysis by-products, e.g., alkanols and water, is effected while the reaction mass is heated to from about 100° C. to about 300° C. This relatively high (i.e., above 100° C.) temperature step is herein designated as the "precure" step.

Included among the suitable starting materials of Formula I are silanes represented by the formula:

(II) 

wherein —OR' can be alkoxy, (1–7 carbon atoms), acyloxy (acetoxy, propionoxy, etc.) and phenoxy. This monomer is then mixed with 0 to 10 mole percent, preferably not more than 5 mole percent, based on total silane reactant of at least one compound of the formula (III) 

wherein each R independently represents a monovalent radical selected from the group consisting of phenyl, and methyl, and wherein —OR' represents one of the groups mentioned above for —OR' in Formula II, and heated with from 1.5 to 10 moles of water per mole of silane, for at least one hour and up to 10 hours at temperatures of at least 50° C. while retaining at least 1.5 mole of alkanol by-products in said mixture per mole of silane starting material assuming complete hydrolysis of all alkoxy-silicon linkages in said mixture, and gradually raising the temperature of the resulting mixture to a final temperature of from 100° to 300° C. while gradually removing by volatilization alkanol by-products and some water, over a time interval of at least 5 minutes, and continuing condensation and heating in the range of 100° to 300° C. for a time short of solid or gel formation in said temperature range.

Included are methyltrimethoxysilane, methyltriethoxysilane, methyltri-n-propoxysilane, and methyltriisopropoxysilane, as well as compounds with mixed alkoxy groups. An example of a co-reactant embraced by Formulae I and III is trimethylmethoxysilane and an example embraced by Formula I is diphenyldiethoxysilane.

A comonomer that is within Formula I or that is an alkyl orthosilicate, if employed, can be used to modify the properties of the resins according to principles known generally to the art. Thus, comonomers containing 3 or 4 alkoxy groups act as crosslinking agents; those with 2 alkoxy groups act to increase chain length and decrease crosslinking; and those with one alkoxy group act as chain-terminating agents. In particular, inclusion of dialkoxysilanes such as dimethyldiethoxysilane can be used to diminish crosslinking and thus provide less brittle products. Inclusion of more than about 5 mole percent of alkyl orthosilicates can lead to excessive crosslinking and attendant brittleness, and quantities of other comonomers substantially above this amount may cause decreased chemical resistance.

In this embodiment, too, the concentration of water in the initial hydrolysis-condensation reaction mixture should be in the range of from about 1.5 moles to about 10 moles of water per mole of silane reactants. Likewise, the other remarks made hereinbefore with respect to resin precipitation and avoidance thereof apply to the production of a solid, machinable polysiloxane, as do also the remarks made with regard to the temperature and pressure of the reaction, and the retention of hydrolysis products (e.g., an alkanol) in the reaction mass during hydrolysis and initial condensation.

Initial hydrolysis-condensation is conveniently carried out by placing in a flask pure water, methyltrialkoxysilane, the acid content of which has been suitably adjusted, and from 0 to 10 mole percent preferably not more than 5 mole percent, based on the total hydrolyzable silanes, of a compound of the kind embraced by Formula III. If desired or deemed necessary, these compounds may be purified. The resulting mixture is then heated under reflux conditions.

The initially cloudy reaction mixture clears on heating, usually within an hour, because the hydroxyhydrocarbon by-product, specifically alcohol, dissolves the other components of the mixture. As previously has been stated, a suitable degree of hydrolysis-condensation is usually obtained if reflux is allowed to proceed for from about 1 to 4 hours after the mixture clears.

Other conditions with respect to the permissible acid content during the initial hydrolysis-concentration step, and concerning other influencing variables have been given hereinbefore.

In making methylpolysiloxanes referred to above, as well as, for instance, (methyl)(phenyl) polysiloxanes, some alkanol or other hydrolysis by-product should be retained, as previously indicated, in the reaction mass during hydrolysis and initial condensation for the reasons previously given. To avoid gelation and effect polysiloxane formation at a conveniently rapid rate, the acidity of the initial hydrolysis-condensation reaction mixture advantageously is suitably controlled. After initial hydrolysis and condensation controlled volatilization of hydrolysis by-products and water is effected, while the temperature of the mixture is raised to temperatures in the range of 100° to 300° C., thereby to precure the resin in the manner and for the reasons previously stated.

Other techniques for preparing an organopolysiloxane include forming a mixture which comprises a precursor hydrolyzable to methylsilanetriol, a precursor hydrolyzable to phenylsilanetriol, and water. The mixture is then heated and concentrated by removing a substantial portion but not all of the volatile components, then heated above the boiling point of pure water at the prevailing pressure; and formed and heated for a period of 1 hour up to 30 days at a temperature below the boiling point of pure water at the prevailing pressure to provide a machinable, thermosetting, heat-resistant organopolysiloxane body.

According to one procedure of the present invention a mixture which comprises a hydrolyzable methyltrialkoxysilane, a hydrolyzable phenyltrialkoxysilane, and water in a relative molar ratio of at most $x:y:1.5(x+y)$, respectively, wherein $x$ and $y$ are independently selected from the range of 1 to 10, inclusive, is heated at a temperature between ambient temperature and reflux temperature for a time of 1 to 10 hours; 50 to 90 mole percent of the alkanol by-product is removed by volatilization; the reaction mixture is heated to effect precure at a temperature within the range of up to 100 centigrade degrees above the boiling point of pure water at the prevailing pressure for a time up to 30 minutes; and the resinous mixture thus obtained is formed, usually by casting, and then cured for a time of at least 1 hour and up to 30 days at a temperature of from 1 centigrade degree to 60 centigrade degrees below the boiling point of pure water at the prevailing pressure to give a machineable, thermosetting, heat-resistant organopolysiloxane body.

The methyltrialkoxysilanes and phenyltrialkoxysilanes cited in the preceding paragraph refer to compounds of the formula $CH_3Si(OR)_3$ and $C_6H_5Si(OR)_3$, wherein R represents a monovalent alkyl radical of less than five (i.e., 1–4) carbon atoms. Examples of such methyltrialkoxysilanes are methyltrimethoxysilane, methyltriethoxysilane, methyltri(1-propoxy)silane, methyltri(2-propoxy)silane, methyltri(2 - methyl - 2-propoxy)silane, methyltri(1 - butoxy)silane, and methyltri(2 - butoxy)silane; examples of phenyltrialkoxysilanes are phenyltrimethoxysilane, phenyltriethoxysilane, phenyltri(1 - propoxy)silane, phenyltri (2-propoxy)silane, phenyltri(2-methyl-2-propoxy)silane, phenyltri (1-butoxy)silane, and phenyltri(2-butoxy)silane.

A further method that provides an especially heat-resistant, machinable, thermosetting organopolysiloxane body comprises heating a mixture which comprises a hydrolyzable methyltrialkoxysilane, a hydrolyzable phenyltrialkoxysilane, and water in a relative molar ratio of at most $x:y:1.5(x+y)$, respectively and advantageously a ratio of $x:y:3(x+y)$, respectively, wherein $x$ and $y$ are independently selected from the range of 1 to 10, inclusive, at a temperature between ambient temperature and 150° C. for a time of 1 to 10 hours, removing 50 to 90 mole percent of the alkanol by-product by volatilization; heating the reaction mixture to effect precure at a temperature within the range of from 5 centigrade degrees up to 110 centigrade degrees above the boiling point of pure water at the prevailing pressure, but usually not above 250° C., for a time up to 30 minutes; casting and then curing the resinous mixture thus obtained for at least one day at a temperature within 10 centigrade degrees below the boiling point of pure water at the prevailing pressure, then at a temperature increasing continually up to a maximum of up to 350° C. over a period of from 2 to 30 days, and finally allowing the sample to return slowly to ambient temperature over a time of from 1 to 12 hours.

A preferred procedure comprises heating at reflux temperature, for from 2 to 4 hours, a reaction mixture which comprises methyltriethoxysilane, phenyltriethoxysilane, and water in a relative molar ratio of at most $$x:y:1.5(x+y)$$

respectively, and advantageously a ratio of $x:y:3(x+y)$, respectively; in other words, on a molar basis the ratio of water to the sum of $x+y$ is a minimum of 1.5 and advantageously is 3. The values $x$ and $y$ are independently selected from the range of 1 to 5, inclusive. Additional steps in the preferred procedure include distilling 70 to 80 mole percent of 95% ethanol by-product from the reaction mixture, subjecting the distillation residue to a precure at 110° to 200° C. for a time up to 10 minutes at ambient pressure; and finally casting and then curing the resulting resinous mixture at 25° to 95° C. and at about atmospheric pressure for a time of from one day to one week to give a machinable, thermosetting, heat-resistant organopolysiloxane body.

The initial reaction mixture of this procedure optionally contains an acidic or basic catalyst, although the hydrolysis and subsequent condensation normally proceed at a convenient rate without them. To avoid premature gelation of the resins the quantity of acid or base in the reaction mixture must be below 0.01 mole of acid or base per mole of hydroyzable silanol precursor. Similarly a solvent, e.g., ethanol, can be added to render the reaction mixture homogeneous.

The initial reaction mixture also may contain precursors of methylsilanetriol and phenylsilanetriol in the above-defined ratios and 0 to 10 mole percent usually 0 to 5 mole percent, of a co-reactant which, when present, usually comprises at least 1 mole percent of the mixture. (The aforementioned mole percentages are based on the hydrolyzable silane components of the initial mixture.) The aforesaid co-reactant comprises at least one compound of the formula (IV)

wherein $Z^1$, $Z^2$, and $Z^3$ represent monovalent hydrocarbon radicals independently selected from the group consisting of phenyl, methyl and hydroxy radicals. Examples of such co-reactants are trimethylsilanol, and diphenylsilanediol. These co-reactants can be added to the reaction mixture in the form of their precursors of the formula (V)

wherein $R^1$, $R^2$ and $R^3$ represent monovalent radicals independently selected from the group consisting of aryl, methyl, and the alkoxy radical R'O— that is shown as the fourth radical in Formula V, wherein R' has the meaning previously defined for Formulae II and III, but the R' of each of $R^1$, $R^2$ and $R^3$ when present and of R'O as the fourth radical may be different. Examples of such precursors are trimethylmethoxysilane and diphenyldiethoxysilane.

A further variation in the procedure can be achieved by hydrolyzing individually a hydrolyzable methyltrialkoxysilane and a hydrolyzable phenyltrialkoxysilane, and then combining the resulting organopolysiloxanes to form the initial mixture described above. The resulting resinous mixture ultimately yields, by the method described, a machinable, thermosetting, heat-resistant organopolysiloxane body.

Resinous products produced by the foregoing procedures are machinable, heat-resistant bodies comprising or consisting essentially of the siloxane condensation product of methylsilanetriol and phenylsilanetriol, in a molar ratio of from 1:10 to 10:1 (preferably from 1:5 to 5:1), respectively, and into which also may be incorporated, e.g., by co-condensation of the latter-named diol with the methylsilanetriol and phenylsilanetriol, from 0 to 10 (preferably from 0 to 5) mole percent of the siloxane condensation product of diphenylsilanediol.

It will be understood, of course, by those skilled in the art that the silanols mentioned in the preceding paragraph, as well as the foregoing and others set forth elsewhere in the specification and in the appended claims, need not be preformed in making the siloxane condensation product. The aforementioned silanols employed therefore include both those which can be preformed (that is, prepared and isolated prior to undergoing a condensation reaction to form an organopolysiloxane) as well as those which are transitory (that is, incapable of being isolated in pure or substantially pure form as such before condensing to form siloxane linkages).

Cathodoluminescent phosphors are incorporated into the organopolysiloxanes by several methods. For example, the phosphor can be mixed with the starting materials prior to the condensation reaction. Generally, the phosphor is uniformly dispersed into the organopolysiloxane at any desired stage prior to the final curing.

A more specific embodiment of the method features of the present invention is directed to a method of producing a cathodoluminescent composition which comprises; hydrolyzing a hydrolyzable silane including at least one compound represented by the general formula $$R_nSiZ_{4-n}$$

wherein each R independently represents a member of the group consisting of methyl and phenyl groups, each Z independently represents a hydrolyzable group, and $n$ represents a positive integer from 1 to 3; condensing the hydrolysis product to yield a heat-curable organopolysiloxane; partly curing the heat-curable organopolysiloxane; adding to the partly cured organopolysiloxane in liquid state, a cathodoluminescent phosphor in solution or finely divided condition in an amount effective in imparting the desired characteristics to the cured organopolysiloxane composition; mixing the resulting mass to form a homogeneous admixture; and completing the cure of the partly cured organopolysiloxane in the presence of said cathodoluminescent phosphor.

Taking as an example the production of a cast resin to obtain a hard, machinable, luminescent, heat-resistant body, the final cure of such a resin can be carried out, if desired, at room temperature (20°–30° C.) or lower merely by allowing the cast resin to remain undisturbed.

Although the final cure may be effected without added heat, a more convenient procedure involves heating the modified, precured, organopolysiloxane resin at about 90° C. for varying time intervals, e.g., for from about 1 to 3 days, or sometimes longer, for instance up to 7 days. The final stages of cure can also be carried out at temperatures above 100° C. after a cure at 90° C. has brought the resin to a substantially hard condition.

The following examples will serve to illustrate the present invention but is not considered limiting thereof in any manner.

EXAMPLE 1

(A) Preparation of an organopolysiloxane

A 250-ml. three-necked flask was equipped with a thermometer, magnetic stirrer and condenser. The condenser was provided with a take-off to allow reflux or distillation. In the thusly-equipped flask 94 ml. (0.5 mole) of methyltriethoxysilane, 60 ml. (0.25 mole) of phenyltriethoxysilane and 40.5 ml. (2.25 moles) of water were charged. The resulting two-phase mixture was heated to about 80° C. After heating for about 5 minutes at this temperature a one-phase system was formed. This single-phase reaction mass was heated under reflux with stirring for 4 hours. At the end of this time about 80% of the theoretical amount of by-product ethanol was recovered as a distillate. The residual liquid organopolysiloxane contained about 60% by weight of solids. The organopolysiloxane therein, which had an average molecular weight of about 86.5, may be represented in its completely condensed state by the formula

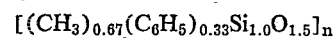

The aforementioned residue of liquid organopolysiloxane resin was transferred to a 300-ml. beaker in which it was heated with stirring to 140° C. to effect precure. It was held only momentarily at 140° C. A clear, viscous, incompletely condensed resin resulted.

(B) Incorporation of phosphors in an organopolysiloxane resin

To 74 grams of precured resin (about ½ mole prior to precure to 140° C.) dissolved in ethanol (50 ml.) and cooled to 75° C. was added 0.5 gram of the following inorganic phosphors:

$ZnS:Ag$
$(ZnCd)S:Ag$
$(ZnCd)S:Cu$
$(ZnS):Cu$
$Zn_3(PO_4)_2:Mn$
$Zn_2SiO_4:Mn$

The resulting compositions were thoroughly mixed together to obtain a uniform liquid mass. The mixture was then precured again by heating to 140° C. After this, castings were made by pouring samples into small circular aluminum pans wherein discs are formed when the resin was fully cured.

The disc samples were placed in a 90° C. oven for 48 hours. At the end of this period of time the cured discs were hard. Testing of the discs in vacuum with a tesla coil showed excellent luminous properties.

Luminescent compositions produced according to the present invention overcome some of the disadvantages of the prior known methods of utilizing phosphors. The uniqueness of the compositions of the present invention are due largely to the particularly desirable and valuable characteristics of the organopolysiloxane as defined herein which can be made not only in liquid, semi-liquid or solid form but can also be produced in different opacities to meet the requirements of a particular service application. As a liquid, the luminescent resinous composition can be adapted to any convenient shape or can be used in a flowing system. Similarly, they can be cast into a variety of shapes from thin films to bulk moldings that range in thickness from mils to several inches. The concentration of the phosphors can readily be varied over a considerable range as desired or as conditions may require. Generally, the ratio of phosphor to resin ranges from 10:1 to 0.5:1 but this can vary.

What is claimed is:

1. A phosphor-polysiloxane resin composition exhibiting luminescence when subjected to cathodic excitation radiation consisting essentially of a hydrolysis and condensation resin product produced by contacting with water a hydrolyzable silane compound represented by the general formula:

$$R—Si(OR')_3$$

wherein R is methyl or phenyl and R' independently represents a hydrolyzable group, and mixtures thereof, and from 0 to 10 mole percent based on the total silane present of a member represented by the structural formula:

$$(R)_3—Si—OR'$$

wherein R and R' have the same meaning as above, said water being in an amount of at least 1.5 moles water per mole of hydrolyzable silane, and heating the silane in the presence of water at a temperature of at least about 50° C. for at least about 1 hour, thereafter condensing the hydrolysis product by heating to a temperature of at least 100° C. over a time period of at least about 5 minutes to yield a heat curable organopolysiloxane, partly curing the heat curable organopolysiloxane by heating at a temperature of at least 100° C. to volatize water, thereafter adding to the partly cured organopolysiloxane a phosphor in an amount effective to impart the desired cathodoluminescent properties to the cured organopolysiloxane composition, mixing the resulting mass to form a homogeneous admixture, and completing the cure of the partly cured organopolysiloxane in the presence of said phosphor.

2. The composition as set forth in claim 1 wherein the resin is the hydrolysis and condensation copolymer of methyl triethoxysilane and phenyl triethoxysilane.

3. The composition as set forth in claim 1 wherein the resin is the hydrolysis and condensation product of methyl triethoxysilane.

4. The composition as set forth in claim 1 wherein the resin is the hydrolysis and condensation product of phenyl triethoxysilane.

5. The composition as defined in claim 1 wherein the inorganic phosphor is selected from the group consisting of:

$Zn_2SiO_4:Mn$
$Zn_3(PO_4)_2:Mn$
$ZnS:Ag$
$(ZnCd)S:Ag$
$(ZnCd)S:Cu$
$ZnS:Cu$

6. A shaped article which will luminesce when subjected to cathodic excitation radiation which is produced by contacting with water a hydrolyzable silane represented by the general formula:

$$R—Si(OR')_3$$

wherein R is methyl or phenyl and R' is independently a hydrolyzable group, and mixtures thereof, and from 0 to 10 mole percent based on the total silane present of a member represented by the structural formula:

$$(R)_3—Si—OR'$$

wherein R and R' have same meaning as above, the amount of water being at least 1.5 moles water per mole of hydrolyzable silane, and heating said hydrolyzable silane for at least 1 hour at a temperature of at least 50° C. condensing the hydrolysis product by raising the temperature over a period of time of at least 5 minutes to a temperature of at least about 100° C. to yield a heat curable organopolysiloxane, partly curing the heat curable polysiloxane by heating at a temperature of at least about 100° C. to volatilize water, and prior to the final curing step, adding to the organopolysiloxane a luminescent phosphor in finely divided state or in solution in sufficient amount to impart the desired cathodoluminescent properties to the cured organopolysiloxane composition, mixing the resulting mass to form a homogeneous admixture, shaping the article and completing the cure of the partly cured organopolysiloxane in the presence of the phosphor.

7. A substrate coated with a luminescent polysiloxane film produced by contacting with water and heating in the presence of water a hydrolyzable silane represented by the general formula:

$$R—Si(OR')_3$$

wherein R is methyl or phenyl, and R' independently represents a hydrolyzable group, and mixtures thereof, and from 0 to 10 mole percent based on the total silane present of a member represented by the structural formula:

$$(R)_3—Si—OR'$$

wherein R and R' have the same meaning as above, the amount of water being at least 1.5 moles water per mole of hydrolyzable silane, said heating being carried out for at least 1 hour at a temperature of at least 50° C., condensing the hydrolysis product so obtained by raising the temperature over a time period of at least 5 minutes to a temperature of about 100° C. to yield a heat curable organopolysiloxane, partly curing the heat curable organopolysiloxane by heating at a temperature of at least about 100° C. to volatilize water, adding to the organopolysiloxane prior to the final curing thereof a phosphor which will exhibit luminescence under cathodic excitation radiation in an amount effective to impart the desired luminescent properties to the cured organopolysiloxane composition, mixing the resulting mass to form a homogeneous admixture, casting the film on the substrate and completing the cure of the partly cured polysiloxane by heating to a temperature of at least about 100° C. in the presence of said phosphor.

8. A method of producing a luminescent polysiloxane composition which luminesces when subjected to cathodic excitation radiation comprising:

hydrolyzing by contacting with water and heating in the presence of water a hydrolyzable silane compound represented by the general formula:

$$R—Si(OR')_3$$

wherein R is methyl or phenyl and R' is independently a hydrolyzable group, and mixtures thereof, and from 0 to 10 mole percent based on the total silane present of a member represented by the structural formula:

$$(R)_3—Si—OR'$$

wherein R and R' have the same meaning as above, the amount of water being at least 1.5 moles water per mole of hydrolyzable silane, said heating being carried out for at least one hour at a temperature of at least 50° C., condensing the hydrolysis product by raising the temperature over a time period of at least 5 minutes to a temperature of at least about 100° C. to yield a heat curable organopolysiloxane, partly curing the heat curable organopolysiloxane by heating at a temperature of at least about 100° C., prior to the final curing step adding to the organopolysiloxane a phosphor in a finely divided state or in solution in an amount effective in imparting the desired luminescent properties to the cured organopolysiloxane composition, mixing the resulting mass to form a homgeneous admixture and completing the cure of the partly cured organopolysiloxane in the presence of said phosphor.

9. A method of producing a polysiloxane film on a substrate which film exhibits luminescence when subjected to cathodic excitation radiation comprising:

contacting with water a hydrolyzable silane compound represented by the general formula:

$$R—Si(OR')_3$$

wherein R is methyl or phenyl, and R' is independently a hydrolyzable group, and mixtures thereof, and from 0 to 10 mole percent based on the total silane present a member represented by the structural formula:

$$(R)_3—Si—OR'$$

wherein R and R' have the same meaning as above and heating said silane in the presence of water in the amount of at least 1.5 moles water per mole of hydrolyzable silane at a temperature of at least about 50° C. for at least about 1 hour, condensing the hydrolysis product by heating to a temperature of at least 100° C. over a time period of at least 5 minutes to yield a heat curable organopolysiloxane, partly curing the heat curable organopolysiloxane by heating at a temperature of at least 100° C. to volatilize water, adding to the partly cured organopolysiloxane a phosphor in an amount effective in imparting the desired luminescent properties to the cured organopolysiloxane composition, mixing the resulting mass to form a homogeneous admixture, applying the admixture to a substrate to form a uniform coating thereon, and completing the cure of the partly cured organopolysiloxane in the presence of said phosphor.

10. The method of claim 1 wherein said substrate is glass.

References Cited

UNITED STATES PATENTS

| | | | |
|---|---|---|---|
| 2,375,998 | 5/1945 | McGregor et al. | 260—46.5 |
| 2,832,794 | 4/1958 | Gordon | 260—46.5 |

FOREIGN PATENTS

| | | |
|---|---|---|
| 1,318,799 | 1/1963 | France. |
| 1,020,752 | 2/1966 | Great Britain. |

HELEN M. McCARTHY, Primary Examiner

ROBERT D. EDMONDS, Assistant Examiner

U.S. Cl. X.R.

117—33.5; 313—92.